United States Patent
Hatano et al.

(10) Patent No.: US 9,175,361 B2
(45) Date of Patent: Nov. 3, 2015

(54) AUSTENITIC HIGH MN STAINLESS STEEL AND METHOD PRODUCTION OF SAME AND MEMBER USING THAT STEEL

(75) Inventors: Masaharu Hatano, Tokyo (JP); Shigeo Fukumoto, Tokyo (JP); Hideki Fujii, Tokyo (JP); Shinichi Ohmiya, Tokyo (JP)

(73) Assignee: Nippon Steel & Sumikin Stainless Steel Corporation, Tokyo (JP)

( * ) Notice: Subject to any disclaimer, the term of this patent is extended or adjusted under 35 U.S.C. 154(b) by 294 days.

(21) Appl. No.: 13/824,290

(22) PCT Filed: Sep. 29, 2011

(86) PCT No.: PCT/JP2011/073030
§ 371 (c)(1),
(2), (4) Date: Mar. 15, 2013

(87) PCT Pub. No.: WO2012/043877
PCT Pub. Date: Apr. 5, 2012

(65) Prior Publication Data
US 2013/0174949 A1 Jul. 11, 2013

(30) Foreign Application Priority Data
Sep. 29, 2010 (JP) ................................. 2010-219396

(51) Int. Cl.
| | | |
|---|---|---|
| *C21D 8/10* | (2006.01) | |
| *C22C 38/42* | (2006.01) | |
| *C22C 38/44* | (2006.01) | |
| *C22C 38/58* | (2006.01) | |
| *C21D 8/02* | (2006.01) | |
| *C21D 6/00* | (2006.01) | |
| *F16J 12/00* | (2006.01) | |
| *C22C 38/00* | (2006.01) | |
| *C22C 38/02* | (2006.01) | |
| *F16K 51/00* | (2006.01) | |
| *F16L 9/02* | (2006.01) | |
| *F17C 1/00* | (2006.01) | |

(52) U.S. Cl.
CPC ................ *C21D 8/105* (2013.01); *C21D 6/004* (2013.01); *C21D 6/005* (2013.01); *C22C 38/001* (2013.01); *C22C 38/002* (2013.01); *C22C 38/02* (2013.01); *C22C 38/42* (2013.01); *C22C 38/44* (2013.01); *C22C 38/58* (2013.01); *F16J 12/00* (2013.01); *F16K 51/00* (2013.01); *F16L 9/02* (2013.01); *F17C 1/00* (2013.01); *C21D 2211/001* (2013.01)

(58) Field of Classification Search
None
See application file for complete search history.

(56) References Cited

U.S. PATENT DOCUMENTS

| | | | |
|---|---|---|---|
| 5,286,310 A | * | 2/1994 | Carinci et al. ................ 148/327 |
| 2005/0178477 A1 | * | 8/2005 | Igarashi et al. ............... 148/325 |
| 2006/0193743 A1 | * | 8/2006 | Semba et al. ................... 420/53 |
| 2009/0159602 A1 | | 6/2009 | Hatano et al. |
| 2011/0064649 A1 | | 3/2011 | Semba et al. |

FOREIGN PATENT DOCUMENTS

| | | |
|---|---|---|
| CN | 1833043 A | 9/2006 |
| EP | 1 944 385 A1 | 7/2008 |
| JP | 59-10493 A | 1/1984 |
| JP | 7-70700 A | 3/1995 |
| JP | 2005-154890 A | 6/2005 |
| JP | 2007-126688 A1 | 5/2007 |
| JP | 2008-38191 A | 2/2008 |
| JP | 2009-30128 A | 2/2009 |
| JP | 2009-299174 A | 12/2009 |
| JP | 2010-121190 A | 6/2010 |
| JP | 2010-196142 A | 9/2010 |
| KR | 10-2006-0099388 A | 9/2006 |
| KR | 10-2008-0058440 A | 6/2008 |
| WO | WO 2004-083476 A1 | 9/2004 |
| WO | WO 2004-083477 A1 | 9/2004 |
| WO | WO 2005/045082 A1 | 5/2005 |
| WO | WO 2007-052773 A1 | 5/2007 |
| WO | WO 2007/052773 A1 | 10/2007 |

OTHER PUBLICATIONS

Hatano at al., "Suiso Energy Yo Tei Ni Austenitic Stainless Steel no Kaihatsu", Current advances in materials and processes, Sep. 1, 2007, vol. 20, No. 6, pp. 1068-1071.
International Search Report mailed on Jan. 10, 2012, issued in PCT/JP2011/073030.
PCT/IPEA/409—issued in PCT/JP2011/073030 mailed Aug. 24, 2012.
Extended European Search Report for Application No. 11829427.1 dated Mar. 20, 2015.

* cited by examiner

Primary Examiner — Deborah Yee
(74) Attorney, Agent, or Firm — Birch, Stewart, Kolasch & Birch, LLP

(57) ABSTRACT

Inexpensive stainless steel and inexpensive and high strength stainless steel which has excellent hydrogen environment embrittlement resistance even if used in a hydrogen resistant environment in over 40 MPa high pressure hydrogen gas or a hydrogen resistant environment in liquid hydrogen, characterized by containing, by mass %, C: 0.1% or less, Si: 0.4 to 1.5%, Mn: 8 to 11%, Cr: 15 to 17%, Ni: 5 to 8%, Cu: 1 to 4%, and N: 0.01 to less than 0.15% and having a balance of Fe and unavoidable impurities, having a volume rate of δ-ferrite of 10% or less, and having a long axis of δ-ferrite before annealing of 0.04 to 0.1 mm.

20 Claims, No Drawings

US 9,175,361 B2

AUSTENITIC HIGH MN STAINLESS STEEL AND METHOD PRODUCTION OF SAME AND MEMBER USING THAT STEEL

TECHNICAL FIELD

The present invention relates to austenitic high Mn stainless steel which has excellent mechanical properties (strength and ductility) under a high pressure hydrogen gas or liquid hydrogen environment.

Further, the present invention relates to a gas tank for high pressure hydrogen gas use or a tank for liquid hydrogen use which has a container body and liner comprised of austenitic high Mn stainless steel which is excellent in hydrogen environment embrittlement resistance.

Furthermore, the present invention relates to piping for transporting high pressure hydrogen gas or liquid hydrogen which is comprised of austenitic high Mn stainless steel which is excellent in hydrogen environment embrittlement resistance.

Further, the present invention relates to a valve connected to piping transporting high pressure hydrogen gas or liquid hydrogen which is comprised of austenitic high Mn stainless steel which is excellent in hydrogen environment embrittlement resistance.

BACKGROUND ART

In recent years, from the viewpoint of global warming, to suppress the exhaust of room temperature effect gases ($CO_2$, $NO_x$, and $SO_x$), progress has been made in development of technology which uses hydrogen as energy. In the past, when storing hydrogen as high pressure hydrogen gas, thick-walled Cr—Mo steel tanks have been filled with hydrogen gas up to about pressures of about 40 MPa.

However, tanks made of such Cr—Mo steel fall in fatigue strength due to fluctuations in inside pressure and penetration by hydrogen due to repeated filling and release of high pressure hydrogen, so the wall thickness must be made 30 mm or so. The weight therefore builds up. For this reason, the increase in weight and increase in size of the equipment become serious issues.

The existing JIS standard SUS316-based austenite stainless steel (hereinafter referred to as "SUS316 steel") has a hydrogen embrittlement resistance under a high pressure hydrogen gas environment which is better than other steel for structural use, for example, carbon steel, including the above Cr—Mo steel, and JIS standard SUS304-based austenite stainless steel (hereinafter referred to as "SUS304 steel"), so is being used for piping materials or high pressure hydrogen fuel tank liners of fuel cell vehicles as well.

SUS316 steel is stainless steel which contains expensive Ni: 10% or more and Mo: 2% or more. For this reason, SUS316 steel has major problems in general applicability and economy (cost).

Further, to store and transport a large amount of hydrogen gas, making the pressure of the hydrogen gas a high pressure of over 40 MPa and making active use of liquid hydrogen may be mentioned. Regarding the increase in pressure, for example, to use piping made of SUS316 steel in an over 40 MPa high pressure hydrogen gas environment, the point has been raised that it would be necessary to increase the currently 3 mm wall thickness piping to over 6 mm thickness or the piping would not be able to withstand use strength-wise.

For ultralow temperature use of liquid hydrogen, in the past, austenitic SUS304 steel or SUS316 steel has been used. For liquid hydrogen containers as well, low temperature hydrogen gas embrittlement has to be considered at the top layer part where the liquid hydrogen becomes vapor, so it is preferable to use SUS316 which is excellent in hydrogen embrittlement resistance.

Further, in recent years, in advance of the introduction of fuel cell vehicles, progress has been made in official building of prototypes of hydrogen stations and running of proving tests. Hydrogen stations which store large amounts of hydrogen as liquid hydrogen and which can raise the liquid hydrogen in pressure and supply it as over 70 MPa high pressure hydrogen gas are also in the proving stage. As the world moves to commercial use and popularization of such hydrogen stations, the need for an inexpensive metal material reduced in Ni and Mo and an inexpensive and high strength metal material which are able to be used in both hydrogen environments of high pressure hydrogen gas and liquid hydrogen has been becoming stronger.

In the past, high nitrogen-content austenitic stainless steel has been known as stainless steel for high pressure hydrogen gas use which is raised in material strength.

For example, PLT 1 discloses stainless steel for high pressure hydrogen gas use which contains N: 0.1 to 0.5%, Cr: 22 to 30%, Ni: 17 to 30%, Mn: 3 to 30%, and any of V, Ti, Zr, and Hf and which satisfies $5Cr+3.4Mn \leq 500N$ and containers and equipment comprised of that steel.

Furthermore, PLT 2 discloses stainless steel for high pressure hydrogen gas use which contains N: 0.1 to 0.5%, Cr: 15 to 22%, Ni: 5 to 20%, Mn: 7 to 30%, and any of V, Ti, Zr, and Hf and which satisfies $2.5Cr+3.4Mn \leq 300N$ and containers and equipment comprised of that steel.

The stainless steels which are disclosed in these PLT 1 and PLT 2 are directed to higher Cr and higher Ni compared with SUS316 steel. In the stainless steel which is disclosed in PLT 2 with a relatively small content of alloy elements as well, substantially the amount of Cr is over 17%, the amount of N is over 0.25%, and Ni, Mn, Mo, Nb, etc. are contained making it high alloy steel.

PLT 3 discloses a pressure vessel and pipe for piping use which are excellent in hydrogen environment embrittlement resistance and stress corrosion cracking resistance and which can be used for 70 MPa or more high pressure hydrogen gas without depending on a larger wall thickness and larger diameter. The steel which is used for these pressure vessel and pipe for piping use is comprised of a composition of ingredients of Cr: 15 to 20%, Ni: 8 to 17%, Si: 1.3 to 3.5%, Mn: 3.5% or less, and N: 0.2% or less.

PLT 4 discloses austenitic stainless steel welded pipe which is suitable for transport of 40 MPa or so high pressure hydrogen which is made of stainless steel containing Cr: 14 to 28%, Ni: 6 to 20%, Si: 4% or less, Mn: 3% or less, and N, 0.25% or less.

The stainless steels which are disclosed in PLT 3 and PLT 4 feature addition of Si and reduction of Mn and contain Ni in amounts of substantially 9 to 15% or about the same as or more than SUS316 steel.

The inventors proposed in PLT 5 austenitic high Mn stainless steel which has workability which enables cold working, deep drawing, and other press forming by a high working rate and is maintained in nonmagnetic property without formation of strain-induced martensite even after working. This stainless steel has trace amounts of Ni: 6% or less and Mo: 0.3% or more added and is remarkably superior in economy compared with SUS316 steel.

Furthermore, the inventors proposed in PLT 6 an austenitic high Mn stainless steel for high pressure hydrogen gas use which is intended for application in low temperature hydrogen gas environments and is inexpensive or both inexpensive and high in strength. This austenitic high Mn stainless steel pursues thorough reduction of alloying and as a result recommends addition of Cr: less than 15%, Ni: 6% or less, N: 0.01 to 0.4%, and a 0.35% trace amount of Mo and defines a parameter Md30 of austenite stability of −120 to 20 in range.

However, this austenitic high Mn stainless steel not only does not consider high pressure hydrogen gas, but also does not consider adaptation to a liquid hydrogen environment. The material properties under the ultralow temperature of liquid hydrogen are unknown.

Therefore, as explained above, no inexpensive stainless steel or inexpensive and high strength stainless steel which can be used in both hydrogen environments of over 40 MPa high pressure hydrogen gas and liquid hydrogen has yet appeared.

CITATIONS LIST

Patent Literature

PLT 1: WO2004-083476 A1
PLT 2: WO2004-083477 A1
PLT 3: Japanese Patent Publication No. 2009-299174 A1
PLT 4: Japanese Patent Publication No. 2010-121190 A1
PLT 5: Japanese Patent Publication No. 2005-154890 A1
PLT 6: WO2007-052773 A1

SUMMARY OF INVENTION

Technical Problem

In view of the above situation, the present invention has as its object to provide inexpensive stainless steel or inexpensive and high strength stainless steel which can be used in both hydrogen environments of over 40 MPa high pressure hydrogen gas and liquid hydrogen.

That is, it has as its object to provide inexpensive stainless steel or inexpensive and high strength stainless steel which can be adapted to both hydrogen environments of high pressure hydrogen gas and liquid hydrogen by design of the materials so that the alloy ingredients and steel structure satisfy specific conditions in the austenitic high Mn stainless steel which the inventors have studied up to here.

Note that, the characteristics which are targeted by the present invention are a hydrogen embrittlement resistance in high pressure hydrogen gas equal to or better than that of SUS316 steel and a strength-ductility balance in liquid hydrogen equal to or better than that of SUS316 steel, more preferably equal to or better than SUS304 steel.

Solution to Problem

The inventors engaged in in-depth research, for solving the above problems and realizing excellent mechanical properties (both strength and ductility) under both environments of high pressure hydrogen gas and liquid hydrogen in the austenitic high Mn stainless steel which they studied up to now, regarding the relationship between the composition of alloy ingredients comprised of the main elements of Cr, Mn, and Ni and the trace elements of Mo etc. and the steel structure and obtained the following new findings whereby they completed the present invention.

(a) To secure not only hydrogen embrittlement resistance in a high pressure hydrogen gas environment, but also a strength-ductility balance equal to or better than SUS304 steel or SUS316 steel in liquid hydrogen (temperature 20K), it is necessary to improve the ductility of the martensite phase transformed from the austenite phase by work induced transformation. For this reason, it is necessary to add Cr: 15% or more. Further, it is effective to make the amount of addition of Ni differ by the amount of Ni in the steel. When not deliberately adding N in the steel in the steelmaking stage, that is, when the amount of N in the steel is 0.01 to less than 0.15%, Ni: 5% or more has to be added. On the other hand, when deliberately adding N in the steel in the steelmaking stage, that is, when the amount of N in the steel is 0.15% or more, Ni: 6% or more has to be added.

(b) In tensile tests in high pressure hydrogen gas and in liquid hydrogen, it was discovered that material breakage occurred starting from regions where the unavoidably contaminating austenite-forming element (Ni) is weak around the small amount of δ-ferrite remaining in the steel. By reducing the negative segregated regions of austenite-forming elements based on the detailed results of analysis of the steel structure, it is possible to realize both excellent hydrogen embrittlement resistance and strength and ductility in liquid hydrogen.

(c) The negative segregated regions of austenite-forming elements can be confirmed by elementary analysis of the steel structure by an X-ray microanalyzer. However, such analysis takes time and effort, so as a simplified means for evaluation which enables relatively easy confirmation from observation of the microstructure, the correlation between the volume rate and size of δ-ferrite remaining in the steel and the results of elementary analysis of the steel structure by an X-ray microanalyzer have been studied.

(d) From the correlation between the above simplified evaluation means and analysis by an X-ray microanalyzer, it was found that to realize both the hydrogen embrittlement resistance and the strength and ductility in liquid hydrogen which the present invention targets, it is sufficient to make the δ-ferrite volume rate in the steel structure and the long axis of δ-ferrite predetermined values or less. Further, it was found that the steel structure differs due to the amount of N in the steel.

(e) To control the prescribed volume rate and size of δ-ferrite, it is effective to make the amount of Cr: 17% or less and the amount of Mn: 11% or less. Furthermore, it is preferable to reduce the amount of Mo, a ferrite-forming element which is added in a trace amount, to 0.3% or less. Mn contributes to improvement of both the hydrogen embrittlement resistance and strength and ductility in liquid hydrogen from ordinary temperature to ultralow temperature as an austenite-stabilizing element and promotes the formation of δ-ferrite in the solidification and hot working temperature region of the steel.

(f) To reduce the size of the δ-ferrite, in addition to the limitations of the composition of ingredients which are discussed in (a) and (e), it is effective to heat to a high temperature of 1200° C. or more then repeat hot working and annealing or to not anneal after hot working, but cold work as is, then anneal so as to refine the δ-ferrite. When not deliberately adding N in the steel in the steelmaking stage, that is, when the amount of N in the steel is 0.01 to less than 0.15%, to reduce the size of the δ-ferrite to a long axis of less than 0.05 mm, it is particularly effective to heat the steel to a 1200° C. or more high temperature, then repeat hot working and annealing or to not anneal after hot working, cold work as is, then anneal. On the other hand, when deliberately adding N in the steel in the steelmaking stage, that is, when the amount of N in the steel is 0.15 to 0.3%, to reduce the size of the δ-ferrite to a long axis of less than 0.05 mm, it is sufficient to adjust the Cr, Ni, or other ingredients discussed in (a). It is not necessary to perform the process of heating the steel to a high temperature of 1200° C. or more and repeating hot working and annealing or the process of not annealing after hot working, but cold working as is and then annealing.

The present invention was made based on the above findings (a) to (f). The gist of the present invention is as follows:

(1) Austenitic high Mn stainless steel characterized by containing, by mass %, C: 0.1% or less, Si: 0.4 to 1.5%, Mn: 8 to 11%, Cr: 15 to 17%, Ni: 5 to 8%, Cu: 1 to 4%, Mo: 0.05 to 0.3% and N: 0.01 to less than 0.15% and having a balance of Fe and unavoidable impurities, having a volume rate of δ-ferrite of 5% or less, and having a long axis of δ-ferrite of 0.05 mm or less.

(2) Austenitic high Mn stainless steel characterized by containing, by mass %, C: 0.1% or less, Si: 0.4 to 1.5%, Mn: 8 to 11%, Cr: 15 to 17%, Ni: 6 to 8%, Cu: 1 to 4%, Mo: 0.05 to 0.3, and N: 0.15 to 0.3% and having a balance of Fe and unavoidable impurities, having a volume rate of δ-ferrite of 5% or less, and having a long axis of δ-ferrite of less than 0.05 mm.

(3) The austenitic high Mn stainless steel as set forth in (1) characterized in that the steel further contains, by mass %, one or more types of elements selected from Al: 0.2% or less, B: 0.01% or less, Ca: 0.01% or less, Mg: 0.01% or less, and REM: 0.1% or less.

(4) The austenitic high Mn stainless steel as set forth in (2) characterized in that the steel further contains, by mass %, one or more types of elements selected from Al: 0.2% or less, B: 0.01% or less, Ca: 0.01% or less, Mg: 0.045% or less, and REM: 0.1% or less.

(6) A method of production of austenitic high Mn stainless steel as set forth in (1), the method of production of austenitic high Mn stainless steel characterized by heating steel, which contains, by mass %, C: 0.1% or less, Si: 0.4 to 1.5%, Mn: 8 to 11%, Cr: 15 to 17%, Ni: 5 to 8%, Cu: 1 to 4%, Mo: 0.05 to 0.3%, and N: 0.01 to less than 0.15% and has a balance of Fe and unavoidable impurities, at 1200 to 1300° C. for 1 hour or more, then hot working it, then annealing it at 900 to 1300° C. to refine δ-ferrite.

(7) A method of production of austenitic high Mn stainless steel as set forth in (1), the method of production of austenitic high Mn stainless steel characterized by heating steel, which contains, by mass %, C: 0.1% or less, Si: 0.4 to 1.5%, Mn: 8 to 11%, Cr: 15 to 17%, Ni: 5 to 8%, Cu: 1 to 4%, Mo: 0.05 to 0.3%, and N: 0.01 to less than 0.15% and has a balance of Fe and unavoidable impurities, at 1200 to 1300° C. for 1 hour or more, then hot working it, then cold working it without annealing, then annealing it at 900 to 1200° C. to refine δ-ferrite.

(8) A method of production of austenitic high Mn stainless steel as set forth in (6) or (7) characterized in that the steel further contains, by mass %, one or more types of elements selected from Al: 0.2% or less, B: 0.01% or less, Ca: 0.01% or less, Mg: 0.01% or less, and REM: 0.1% or less.

(9) A gas tank for high pressure hydrogen use which stores high pressure hydrogen gas with a pressure of 0.1 to 120 MPa, the gas tank for high pressure hydrogen use characterized in that at least one of a container body and liner of the gas tank for high pressure hydrogen use is comprised of the austenitic high Mn stainless steel as set forth in any one of (1) to (4)

(10) A tank for liquid hydrogen use which stores liquid hydrogen, the tank for liquid hydrogen use characterized in that at least one of a container body and liner of the tank for liquid hydrogen use is comprised of the austenitic high Mn stainless steel as set forth in any one of (1) to (4).

(11) Piping for liquid hydrogen use comprised of piping which transports high pressure hydrogen gas of a pressure of 0.1 to 120 MPa, characterized in that the piping is comprised of the austenitic high Mn stainless steel as set forth in any one of (1) to (4).

(12) A valve for high pressure hydrogen use comprised of a valve which is to be connected to piping which transports high pressure hydrogen gas of a pressure of 0.1 to 120 MPa, characterized in that the valve is comprised of the austenitic high Mn stainless steel as set forth in any one of (1) to (4).

(13) Piping for liquid hydrogen use comprised of piping which transports liquid hydrogen, characterized in that the piping is comprised of the austenitic high Mn stainless steel as set forth in any one of (1) to (4).

(14) A valve for liquid hydrogen use comprised of a valve which is to be connected to piping which transports liquid hydrogen, characterized in that the valve is comprised of the austenitic high Mn stainless steel as set forth in any one of (1) to (4).

Advantageous Effects of Invention

According to the present invention, it is possible to obtain inexpensive stainless steel or inexpensive and high strength stainless steel which is excellent in economy without inviting a rise in the alloy cost or manufacturing cost and which has mechanical properties which achieve both a hydrogen embrittlement resistance and strength and ductility in liquid hydrogen equal to or better than SUS316-based austenite stainless steel.

DESCRIPTION OF EMBODIMENTS

Below, the present invention will be explained in detail. Note that, the indication of "%" of content of the elements means "mass %". Further, the material properties in the two environments of high pressure hydrogen gas and liquid hydrogen are referred to as "hydrogen environment embrittlement resistance".

(A) The reasons for limitation of the composition of ingredients will be explained below.

C is an element which is effective for stabilization of the austenite phase or suppression of formation of δ-ferrite in the austenitic high Mn stainless steel of the present invention. Further, C causes the strength of the material to rise by solution strengthening. Therefore, to raise the stability of the austenite phase and to improve the hydrogen environment embrittlement resistance, it is preferable to add 0.01% or more. On the other hand, excessive addition of C results in the effects becoming saturated and raises the strength of the work-induced martensite phase to remarkably impair the ductility in a liquid hydrogen environment, so the upper limit has to be made 0.1%. Preferably, it is 0.04 to 0.08% in range.

Si is an element which is effective for raising the austenite stability to improve the hydrogen environment embrittlement resistance from ordinary temperature to an ultralow temperature environment in the austenitic high Mn stainless steel of the present invention. In addition, it is a solution strengthening element which is also effective in raising the material strength as aimed at in the present invention. To achieve these effects, the lower limit is made 0.4%. Excessive addition of Si assists the formation of δ-ferrite to inhibit the improvement of the hydrogen environment embrittlement resistance as aimed at in the present invention and assists the formation of the sigma phase or other intermetallic compound to possibly cause a drop in the hot workability and toughness. For this reason, the upper limit is made 1.5%. Preferably, it is 0.5 to 1.0% in range.

Mn is an element which is effective for reducing the amount of Ni and for raising the austenite stability to improve the hydrogen environment embrittlement resistance from ordinary temperature to an ultralow temperature environment. To achieve the improvement of economy as aimed at in the present invention, it is necessary to make the amount of the expensive element of Ni added smaller than 8% or smaller than general SUS304 steel. To make up for the drop in the amount of addition of Ni and obtain the above effect, the lower limit of Mn has to be made 8%. On the other hand, excessive addition of Mn assists the formation of δ-ferrite to inhibit the improvement of the hydrogen environment embrittlement resistance as aimed at in the present invention, so the upper limit is made 11%. Preferably, it is 9 to 10% in range.

Cr is an alloy element which is essential for obtaining the corrosion resistance which is demanded from stainless steel. In addition, to secure a strength-ductility balance equal to or better than that of SUS304 steel or other existing stainless steel in liquid hydrogen, as explained in the above (a), Cr is added in 15% or more. On the other hand, excessive addition of Cr assists the formation of δ-ferrite to inhibit the improvement of the hydrogen environment embrittlement resistance as aimed at in the present invention, so the upper limit is made 17%. Preferably, it is over 15 to 16% in range.

Ni, as well known in existing SUS316 steel as well, is an element which is extremely effective for improving the hydrogen environment embrittlement resistance as aimed at by the present invention. As explained in the above (a), to improve both the strength and ductility in liquid hydrogen to the target level, the lower limit of the amount of addition of Ni differs depending on the amount of N in the steel. If the amount of N in the steel is 0.01 to less than 0.15%, the lower limit of Ni has to be made 5%. On the other hand, if the amount of N in the steel is 0.15 to 0.3%, the lower limit of Ni has to be made 6%. Further, to achieve improvement of the economy as aimed at in the present invention, the amount of addition of Ni is made 8% or less or smaller than that of general purpose SUS304 steel. From the viewpoint of improving the hydrogen environment embrittlement resistance and reducing the material costs as aimed at in the present invention, the upper limit of Ni is preferably made 7%.

Cu, like Mn and Ni, is an austenite stabilizing element and an element which is effective for improving the hydrogen environment embrittlement resistance as aimed at in the present invention. Cu forms a solid solution in steel to raise the austenite stability from ordinary temperature to ultralow temperature by a synergistic effect with Mn and forms deformed structures which are resistant to the effects of hydrogen gas embrittlement. To obtain these effects, the lower limit of Cu is made 1%. However, excessive addition of Cu causes Cu to precipitate in the steel and thereby leads to the above effects being saturated or is liable to cause Cu contamination at the time of steelmaking or a drop in the hot workability. For this reason, the upper limit of Cu is made 4%. Preferably, from the viewpoint of achieving both the above effects and manufacturability, the content is 2 to 3% in range.

N is an element which is effective for stabilization of the austenite phase or suppression of formation of δ-ferrite in the austenitic high Mn stainless steel of the present invention. To obtain these effects, the lower limit of N is made 0.01%. To make N less than 0.01%, the steelmaking costs would be increased and also the austenite stability of the steel would be lowered. Further, N is an element which is effective in raising the material strength by solution strengthening. That is, addition of N can impart strength as a structural member even without cold working, so is an effective means for reducing the thickness and weight of the base material.

In the present invention, to raise the material strength, solution strengthening by N is utilized. The case of not deliberately adding N to the steel in the steelmaking stage and using the N which is present in the steel for solution strengthening and the case of deliberately adding N to the steel in the steelmaking stage for solution strengthening will be explained separately.

When not deliberately adding N to the steel in the steelmaking stage, the amount of N in the steel becomes 0.01 to less than 0.15%. On the other hand, when deliberately adding N to the steel in the steelmaking stage, the amount of N in the steel becomes 0.15 to 0.3%. Addition of N over 0.3% is difficult in the normal industrial smelting process. In addition to greatly raising the steelmaking cost, it impairs the improvement of the hydrogen environment embrittlement resistance.

From the viewpoint of achieving both the above effects and manufacturability, the upper limit of the amount of N in the case of deliberately adding N is preferably made 0.25%.

Mo is an element which is extremely effective for improvement of the corrosion resistance, but promotes the stabilization of the austenite phase and the formation of δ-ferrite in the austenitic high Mn stainless steel of the present invention. To improve the hydrogen environment embrittlement resistance as aimed at in the present invention, it is effective to reduce the volume rate of δ-ferrite. The effect of reduction of the δ-ferrite volume rate by reduction of the content of Mo is large. Therefore, the upper limit of Mo is preferably made 0.3%. On the other hand, Mo is an element which unavoidably is mixed in from the scraps of the melting materials. Excessive reduction of Mo leads to restrictions on the melting materials and thereby causes a rise in the manufacturing costs. Therefore, from the viewpoint of achieving both the above effects and manufacturability, the lower limit of Mo is preferably made 0.05%. The more preferable range of Mo is 0.1 to 0.2%.

Al, B, Ca, Mg, and REM are elements which are effective for improvement of the deoxidation action, hot workability, and corrosion resistance, so in accordance with need, one or more types selected from these may be added. However, excessive addition of these elements leads to a remarkable rise in the manufacturing cost. Therefore, when adding these elements, preferably Al: 0.2% or less, B, Ca, and Mg: 0.01% or less, and REM: 0.1% or less. Note that, when N: 0.15 to 0.3%, Mg may be 0.045% or less. Further, the lower limits in the case of addition are preferably Al: 0.01%, B, Ca, and Mg: 0.0002%, and REM: 0.01%.

(B) The reasons for limitation of the steel structure are explained below:

The austenitic high Mn stainless steel of the present invention has the composition of ingredients which is limited in the above (A). To achieve both hydrogen environment embrittlement resistances in high pressure hydrogen and in liquid hydrogen, the negative segregation regions of austenite-forming elements forming the starting point of embrittlement are reduced in the steel structure.

The volume rate of δ-ferrite, as explained in the above (d), differs depending on the amount of N in the steel. If the amount of N in the steel is 0.01 to less than 0.15%, the volume rate of δ-ferrite is 10% or less. However, by heating to a high temperature of 1200° C. or more and repeating hot working and annealing or by not annealing after hot working, but cold working as is, then annealing, the volume rate of δ-ferrite can be made 5% or less. The smaller the volume rate of δ-ferrite the better. The lower limit is not particularly limited. However, when greatly lowering the volume rate of δ-ferrite, the time of the annealing step has to be made longer. Since this lowers the productivity, 1.0% is made the lower limit. On the other hand, when the amount of N in the steel is 0.15 to 0.3%, the volume rate of δ-ferrite is 5% or less, but the process which is performed when the amount of N in the steel is 0.01 to 0.15%, that is, heating to a high temperature of 1200° C. or more and repeating hot working and annealing or not annealing after hot working, but cold working as is, then annealing, becomes unnecessary. However, to greatly lower the volume rate of δ-ferrite, the time of the annealing step has to be made longer. Since this lowers the productivity, 0.1% is made the lower limit. The volume rate of δ-ferrite can, for example, be simply measured by a commercially available ferrite meter made by Fischer. Further, it may also be found by image analysis in observation under an optical microscope.

The long axis of δ-ferrite, as explained in the above (d), differs depending on the amount of N in the steel. If the amount of N in the steel is 0.01 to less than 0.15%, the long axis of δ-ferrite is 0.1 mm or less. However, by heating to a high temperature of 1200° C. or more and repeating hot working and annealing or not annealing after hot working, but cold working as is, then annealing, the long axis of δ-ferrite can be made less than 0.05 mm. The smaller the long axis of δ-ferrite the better. The lower limit of the long axis of δ-ferrite is not particularly limited. However, when the amount of N in the steel is less than 0.01 to 0.15%, if not performing the step of heating to a high temperature of 1200° C. or more and repeating hot working and annealing or the step of not annealing after hot working, but cold working as is, then annealing, the lower limit of the long axis of δ-ferrite is 0.05 mm.

On the other hand, if the amount of N in the steel is 0.15 to 0.3%, the long axis of δ-ferrite is less than 0.05 mm, but the process which is performed when the amount of N in the steel is 0.01 to 0.15%, that is, heating to a high temperature of 1200° C. or more and repeating hot working and annealing or not annealing after hot working, but cold working as is, then annealing, becomes unnecessary. Note that even when the amount of N in the steel is 0.15 to 0.3%, the smaller the long axis of δ-ferrite, the better. It is not however particularly limited.

The long axis of δ-ferrite can be measured by the following procedure. First, from the above measurement by a ferrite meter, the highest δ-ferrite volume rate region is identified. A sample is cut out from that region. The cut out sample is buried in resin then polished and etched and observed under an optical microscope.

In the observed field, the largest long axis of δ-ferrite is measured. Embrittlement in high pressure hydrogen gas and in liquid hydrogen, as explained in the above (b), occurs starting from the weakest region in the material. The weakest region of the material, as explained in the above (d), is the location with the largest long axis of δ-ferrite. Therefore, the long axis of δ-ferrite becomes the largest value in the values which are observed and measured. Note that the smallest long axis of δ-ferrite which can be confirmed by this method of observation is 0.005 mm.

When the amount of N in the steel is 0.01 to less than 0.15%, by performing the process explained below, that is, by annealing after hot working or by cold working as is after hot working, then annealing, so as to make the long axis of δ-ferrite less than 0.05 mm, that is, by refining the δ-ferrite, the properties are improved. To refine the δ-ferrite which is formed in the melting and solidification process before hot working, heating at a 1200 to 1300° C. high temperature is preferable. If the heating temperature exceeds 1300° C., conversely sometimes the formation of δ-ferrite is assisted. The heating time is made 1 hour or more for refining the δ-ferrite. The upper limit of the heating time is not particularly limited, but if considering the industrial productivity at the time of use of a batch furnace, 24 hours or less is preferable.

The hot working is performed for producing sheet, rod, and tube shapes. The working method and the working degree are not particularly limited. The hot worked material is annealed at 900 to 1300° C. to refine the remaining δ-ferrite and adjust the mechanical properties. If the annealing temperature is less than 900° C., the hot rolled material is not sufficiently recrystallized and the result is not preferable. On the other hand, if over 1300° C., crystal grain coarsening causes a drop in the working properties and toughness at break at an ultralow temperature, so this is not preferable.

Further, when producing sheet, rod, and tube cold worked materials, omitting the solubilization (solution annealing) after hot working to cold work the steel to predetermined product shapes, then annealing at 900 to 1200° C. is preferable from the viewpoint of reducing the size (long axis) of the δ-ferrite (austenite negative segregated regions) of the present invention to improve the hydrogen environment embrittlement resistance. If the annealing temperature is less than 900° C., recrystallization becomes insufficient in the austenitic high Mn stainless steel of the present invention, so the result is not preferable. On the other hand, if over 1200° C., crystal grain coarsening causes a drop in the working properties and toughness at break at an ultralow temperature, so this is not preferable.

If the amount of N in the steel is 0.15 to 0.3%, without the above-mentioned process of annealing after hot working or process of cold working as is after hot working, then annealing, it is possible to obtain δ-ferrite with a long axis of less than 0.05 mm, that is, refined δ-ferrite, and possible to improve the properties. Note that if annealing before cold working (solution annealing), the δ-ferrite would grow and the long axis of δ-ferrite could not be made less than 0.05 mm, so this is not preferable.

The austenitic high Mn stainless steel which satisfies the above-mentioned composition of ingredients and steel structure can be used as a structural material for a container body or liner of a tank which stores high pressure hydrogen gas and liquid hydrogen. Further, it can be used as the material for piping for high pressure hydrogen gas and liquid hydrogen use or a valve for high pressure hydrogen gas and liquid hydrogen use.

The austenitic high Mn stainless steel of the present invention can also be used for over 120 MPa pressure vessels, piping, valves, and meters, but in structural design, over 120 MPa pressure specifications are almost never required, so the upper limit of the pressure is preferably made 120 MPa. Further, the upper limit of the usage temperature is made the 80° C. which is envisioned due to the rise in temperature when filling hydrogen gas in an outdoor usage environment. On the other hand, the lower limit is a 20K ultralow temperature in the case of liquid hydrogen use and the working temperature of fuel cell vehicles −40° C. in the case of high pressure hydrogen gas use, but the invention is not limited to these.

EXAMPLES

Next, the present invention will be explained in further detail by examples, but the conditions of the examples are illustrations employed for confirming the workability and effects of the present invention. The present invention is not limited to this illustration. The present invention can employ various conditions so long as not deviating from the gist of the present invention and achieving the object of the present invention.

Stainless steels which have the compositions of ingredients of Table 1 and Table 2 were smelted and hot rolled at a heating temperature of 1150 to 1300° C. to prepare 5.0 mm thick hot rolled plates. Next, the hot rolled plates were annealed at 1080° C. to obtain hot rolled plate annealed materials for use as test materials or the annealing of the hot rolled plates was omitted and the plates were cold rolled to thicknesses of 2.0 mm and, furthermore, the cold rolled sheets were annealed at 1000° C., then pickled to obtain 2.0 mm thick cold rolled and annealed sheets for use as test materials. Note that Table 1 shows the compositions of ingredients of low N test materials with amounts of N of 0.01 to less than 0.15%, while Table 2 shows the compositions of ingredients of high N test materials with amounts of N of 0.15 to 0.3%.

TABLE 1

Unit: mass %

| Steel No. | C | Si | Mn | Cr | Ni | Cu | N | Mo | Others | Remarks |
|---|---|---|---|---|---|---|---|---|---|---|
| L1 | 0.065 | 0.45 | 9.2 | 15.5 | 5.5 | 2.2 | 0.045 | 0.12 | — | Inv.steel |
| L2 | 0.065 | 1.15 | 8.2 | 15.7 | 6.2 | 3.2 | 0.135 | 0.05 | — | Inv.steel |
| L3 | 0.085 | 0.55 | 8.8 | 16.7 | 6.3 | 2.4 | 0.045 | 0.11 | Al: 0.03, Ca: 0.0011 | Inv.steel |
| L4 | 0.065 | 0.65 | 9.2 | 15.5 | 7.5 | 1.5 | 0.025 | 0.13 | — | Inv.steel |
| L5 | 0.055 | 0.62 | 9.2 | 15.4 | 6.6 | 2.7 | 0.045 | 0.18 | Mg: 0.005 | Inv.steel |
| L6 | 0.115 | 0.55 | 8.8 | 15.2 | 6.3 | 2.4 | 0.044 | 0.16 | — | Comp.steel |
| L7 | 0.065 | 1.58 | 8.7 | 15.3 | 6.5 | 2.5 | 0.047 | 0.18 | — | Comp.steel |
| L8 | 0.062 | 0.65 | 11.8 | 15.4 | 6.2 | 2.6 | 0.043 | 0.15 | — | Comp.steel |
| L9 | 0.062 | 0.58 | 8.8 | 14.5 | 6.1 | 2.3 | 0.042 | 0.12 | — | Comp.steel |
| L10 | 0.063 | 0.62 | 8.9 | 17.5 | 6.1 | 2.4 | 0.043 | 0.11 | — | Comp.steel |
| L11 | 0.062 | 0.58 | 9.1 | 15.4 | 4.8 | 2.4 | 0.045 | 0.09 | — | Comp.steel |
| L12 | 0.062 | 0.62 | 9.2 | 15.4 | 6.2 | 0.8 | 0.045 | 0.11 | — | Comp.steel |
| L13 | 0.045 | 0.62 | 9.2 | 15.4 | 6.2 | 2.4 | 0.008 | 0.15 | — | Comp.steel |
| L14 | 0.065 | 0.51 | 8.8 | 15.2 | 5.2 | 2.5 | 0.042 | 0.35 | — | Comp.steel |
| L15 | 0.045 | 0.35 | 8.2 | 15.2 | 5.3 | 1.8 | 0.025 | 0.25 | — | Comp.steel |
| L16 | 0.045 | 0.35 | 7.5 | 16.2 | 5.3 | 1.8 | 0.035 | 0.22 | — | Comp.steel |
| L17 | 0.055 | 0.45 | 9.2 | 15.7 | 6.3 | 2.5 | 0.038 | 0.11 | REM: 0.05 | Inv.steel |
| L18 | 0.055 | 0.45 | 9.2 | 15.2 | 6.2 | 2.6 | 0.042 | 0.09 | B: 0.001 | Inv.steel |
| L19 | 0.060 | 0.55 | 8.8 | 15.5 | 6.2 | 2.3 | 0.045 | 0.05 | Al: 0.15 | Inv.steel |
| L20 | 0.060 | 0.53 | 8.8 | 15.4 | 6.1 | 2.4 | 0.043 | 0.05 | Ca: 0.0012 | Inv.steel |

Note)
Underlines show outside suitable range.

TABLE 2

Unit: mass %

| Steel No. | C | Si | Mn | Cr | Ni | Cu | N | Mo | Others | Remarks |
|---|---|---|---|---|---|---|---|---|---|---|
| H1 | 0.055 | 0.55 | 10.5 | 15.5 | 6.9 | 2.5 | 0.235 | 0.08 | — | Inv. steel |
| H2 | 0.055 | 0.52 | 8.3 | 15.6 | 6.3 | 2.4 | 0.155 | 0.11 | — | Inv. steel |
| H3 | 0.053 | 0.55 | 9.2 | 15.4 | 6.7 | 2.4 | 0.171 | 0.17 | Al: 0.055, Ca: 0.0035, B: 0.0018 | Inv. steel |
| H4 | 0.052 | 0.57 | 9.2 | 15.4 | 6.2 | 2.4 | 0.169 | 0.16 | Mg: 0.045, Ca: 0.0031 | Inv. steel |
| H5 | 0.088 | 0.85 | 8.5 | 16.5 | 7.4 | 1.5 | 0.165 | 0.16 | — | Inv. steel |
| H6 | 0.045 | 0.45 | 9.1 | 15.2 | 6.2 | 2.5 | 0.315 | 0.12 | — | Comp. steel |
| H7 | 0.047 | 0.45 | 9.1 | 15.3 | 5.7 | 2.5 | 0.311 | 0.11 | — | Comp. steel |
| H8 | 0.051 | 0.48 | 8.8 | 15.2 | 5.7 | 2.5 | 0.172 | 0.11 | — | Comp. steel |
| H9 | 0.112 | 0.55 | 8.8 | 15.2 | 6.3 | 1.6 | 0.163 | 0.12 | — | Comp. steel |
| H10 | 0.065 | 1.65 | 8.7 | 15.3 | 6.5 | 1.7 | 0.165 | 0.11 | — | Comp. steel |
| H11 | 0.062 | 0.65 | 11.9 | 15.4 | 6.2 | 1.8 | 0.162 | 0.13 | — | Comp. steel |
| H12 | 0.062 | 0.58 | 8.8 | 14.6 | 6.1 | 1.9 | 0.168 | 0.14 | — | Comp. steel |
| H13 | 0.063 | 0.62 | 8.9 | 17.5 | 6.1 | 1.8 | 0.164 | 0.15 | — | Comp. steel |
| H14 | 0.062 | 0.62 | 9.2 | 15.4 | 6.2 | 0.8 | 0.165 | 0.25 | — | Comp. steel |
| H15 | 0.045 | 0.75 | 8.3 | 16.2 | 6.2 | 1.2 | 0.153 | 0.38 | — | Comp. steel |
| H16 | 0.045 | 0.29 | 8.2 | 15.2 | 5.3 | 1.8 | 0.155 | 0.25 | — | Comp. steel |
| H17 | 0.045 | 0.35 | 7.5 | 16.2 | 5.3 | 1.8 | 0.155 | 0.22 | — | Comp. steel |
| H18 | 0.055 | 0.45 | 9.2 | 15.7 | 6.3 | 2.5 | 0.165 | 0.11 | REM: 0.05 | Inv. steel |
| H19 | 0.055 | 0.55 | 8.8 | 15.5 | 6.2 | 2.3 | 0.180 | 0.08 | Al: 0.08 | Inv. steel |
| H20 | 0.060 | 0.55 | 8.6 | 15.5 | 6.1 | 2.4 | 0.178 | 0.05 | Ca: 0.0003 | Inv. steel |
| H21 | 0.061 | 0.53 | 8.7 | 15.4 | 6.2 | 2.3 | 0.175 | 0.05 | B: 0.0012 | Inv. steel |
| H22 | 0.060 | 0.54 | 8.8 | 15.5 | 6.2 | 2.4 | 0.180 | 0.09 | Mg: 0.0008 | Inv. steel |
| H23 | 0.058 | 0.55 | 8.8 | 15.4 | 6.3 | 2.3 | 0.179 | 0.07 | Ca: 0.0005 | Inv. steel |

Note)
Underlines show outside suitable range.

From the thus obtained 5.0 mm thick hot rolled and annealed sheet test material or 2.0 mm thick cold rolled and annealed sheet test material, tensile test pieces of a total length of 120 mm, a length of the parallel part of 35 mm (distance between evaluation points of 25 mm), and width of 6.25 mm were taken and used for 1) a tensile test in the air, 2) a tensile test in high pressure hydrogen gas, and 3) a tensile test in liquid hydrogen.

The tensile test in the air was performed at a test temperature of ordinary temperature, a test environment of the air, and a strain rate of $8\times10^{-4}$/sec.

The tensile test in high pressure hydrogen gas was performed at a test temperature of ordinary temperature, a test environment of 45 MPa hydrogen, 90 MPa hydrogen, and 120 MPa hydrogen, and a strain rate of $8\times10^{-5}$/sec. Further, the hydrogen environment embrittlement resistance in high pressure hydrogen gas was evaluated by the value of (elongation in high pressure hydrogen gas)/(elongation in air). Note that, the values of (elongation in high pressure hydrogen gas)/(elongation in air) in 45 MPa hydrogen, 90 MPa hydrogen, and 120 MPa hydrogen were expressed by EL: 45 MPa, EL: 90 MPa, and EL: 120 MPa.

The tensile test in liquid hydrogen was performed up to 0.2% yield stress by $1.7\times10^{-4}$/sec then $6.8\times10^{-4}$/sec. The hydrogen environment embrittlement resistance in liquid hydrogen was evaluated by a numerical value expressed by the product of tensile strength and elongation, that is, TS×EL (strength-ductility balance).

As the criteria for evaluation, the following Conventional Examples 1 to 3 were used as the basis for judgment. JIS standard SUS316L steel (hereinafter referred to as "SUS316L steel") was heated, then hot worked to hot rolled sheet. The hot rolled sheet was annealed to produce 5 mm thick hot rolled and annealed sheet. This was used as Conventional Example 1. Further, SUS316L steel was heated, then hot worked to obtain hot rolled sheet. The hot rolled sheet was annealed, then was further cold worked and annealed to produce 2 mm thick cold rolled and annealed sheet. This was used as Conventional Example 2. Further, JIS standard SUS304L steel (hereinafter referred to as "SUS304L steel") was heated, then hot worked to hot rolled sheet. The hot rolled sheet was annealed to produce 5 mm thick hot rolled and annealed sheet. This was used as Conventional Example 3.

Regarding the hydrogen embrittlement resistance in high pressure hydrogen gas, when the EL: 45 MPa, EL: 90 MPa, and EL: 120 MPa of the test materials are the same as or larger than Conventional Example 1, the hydrogen embrittlement resistance in the high pressure hydrogen gas was "excellent". Further, when the EL: 45 MPa, EL: 90 MPa, and EL: 120 MPa of the test materials are the same as or larger than Conventional Example 2, the hydrogen embrittlement resistance in high pressure hydrogen gas was judged to be "extremely excellent".

Regarding the hydrogen environment embrittlement resistance in liquid hydrogen, when the TS×EL of test materials are the same as or larger than Conventional Example 1 or Conventional Example 2, the hydrogen environment embrittlement resistance in liquid hydrogen was evaluated as "excellent". Further, when the TS×EL of test materials are larger than Conventional Example 3, the hydrogen environment embrittlement resistance in liquid hydrogen was evaluated as "extremely excellent".

The δ-ferrite volume rate of the test material was found by a ferrite meter made of Fischer. The long axis of δ-ferrite was measured by preparing a sample burying the cross-section of sheet in a resin, polishing this to a mirror finish, then etching and using the above procedure for observation under an optical microscope.

The results of evaluation of the hydrogen environment embrittlement resistances of the low N test materials are shown in Table 3-1 and Table 3-2. Table 3-1 and Table 3-2 describe the heating temperature at the time of hot working, the presence of annealing of the hot rolled sheet, and the presence of cold rolling (including annealing after cold rolling).

TABLE 3-1

| Test No. | Steel No. | Heating temp. (°C.) | Hot rolled sheet annealing | Cold rolling + annealing | Tensile test in air 0.2% PS (MPa) | Tensile test in air TS (MPa) | Tensile test in air EL (%) | Tensile test in high pressure hydrogen gas EL: 45 MPa (-) | Tensile test in high pressure hydrogen gas EL: 90 MPa (-) | Tensile test in high pressure hydrogen gas EL: 120 MPa (-) | Tensile test in liquid hydrogen 0.2% PS (MPa) | Tensile test in liquid hydrogen TS (MPa) | Tensile test in liquid hydrogen EL (%) | Tensile test in liquid hydrogen TS × EL (MPa · %) | δ-ferrite volume rate (%) | δ-ferrite long axis (mm) | Remarks |
|---|---|---|---|---|---|---|---|---|---|---|---|---|---|---|---|---|---|
| 1 | L1 | 1230 | Yes | No | 260 | 592 | 89.3 | 1.2 | 1.3 | 1.2 | 590 | 1480 | 45 | 66600 | 3.8 | 0.04 | Inv. ex. |
| 2 |  | 1180 | No | Yes | 270 | 600 | 87.5 | 1.1 | 1.0 | 0.9 | 600 | 1550 | 40 | 62000 | 4.5 | 0.08 | Inv. ex. |
| 3 | L2 | 1230 | No | Yes | 305 | 620 | 85.2 | 1.2 | 1.2 | 1.2 | 620 | 1580 | 42 | 66360 | 4.2 | 0.03 | Inv. ex. |
| 4 |  | 1230 | Yes | Yes | 320 | 610 | 83.2 | 1.1 | 1.0 | 0.9 | 630 | 1570 | 40 | 62800 | 3.7 | 0.07 | Inv. ex. |
| 5 | L3 | 1270 | Yes | No | 270 | 600 | 88.2 | 1.1 | 1.2 | 1.1 | 670 | 1580 | 42 | 66360 | 1.4 | 0.01 | Inv. ex. |
| 6 | L4 | 1250 | No | Yes | 260 | 590 | 90.2 | 1.2 | 1.2 | 1.1 | 600 | 1600 | 42 | 67200 | 1.1 | 0.01 | Inv. ex. |
| 7 |  | 1180 | No | Yes | 290 | 600 | 87.5 | 1.1 | 1.0 | 0.9 | 620 | 1620 | 40 | 64800 | 1.2 | 0.06 | Inv. ex. |
| 8 | L5 | 1220 | No | Yes | 410 | 750 | 63.5 | 1.2 | 1.2 | 1.1 | 720 | 1740 | 38 | 66120 | 2.5 | 0.02 | Inv. ex. |
| 9 | L6 | 1250 | No | Yes | 300 | 620 | 87.5 | 1.1 | 1.1 | 1.1 | 850 | 1400 | 29 | 40600 | 2.8 | 0.03 | Comp. ex. |
| 10 | L7 | 1220 | Yes | No | 320 | 550 | 60.5 | 0.8 | 0.7 | 0.6 | 700 | 1300 | 20 | 26000 | 11.5 | 0.11 | Comp. ex. |
| 11 | L8 | 1180 | No | Yes | 260 | 580 | 65.2 | 0.8 | 0.8 | 0.6 | 600 | 1450 | 38 | 55100 | 12.1 | 0.07 | Comp. ex. |
| 12 | L9 | 1200 | No | Yes | 250 | 580 | 86.5 | 1.1 | 1.1 | 1.0 | 800 | 1480 | 31 | 45880 | 3.1 | 0.04 | Comp. ex. |
| 13 | L10 | 1180 | No | Yes | 290 | 570 | 55.5 | 0.7 | 0.6 | 0.5 | 900 | 1350 | 27 | 36450 | 10.5 | 0.12 | Comp. ex. |
| 14 | L11 | 1220 | No | Yes | 270 | 560 | 57.5 | 0.7 | 0.6 | 0.5 | 900 | 1350 | 28 | 37800 | 6.8 | 0.11 | Comp. ex. |

TABLE 3-1-continued

| Test No. | Steel No. | Heating temp. (°C.) | Hot rolled sheet annealing | Cold rolling + annealing | Tensile test in air 0.2% PS (MPa) | TS (MPa) | EL (%) | Tensile test in high pressure hydrogen gas EL: 45 MPa (—) | EL: 90 MPa (—) | EL: 120 MPa (—) | Tensile test in liquid hydrogen 0.2% PS (MPa) | TS (MPa) | EL (%) | TS × EL (MPa · %) | δ-ferrite volume rate (%) | δ-ferrite long axis (mm) | Remarks |
|---|---|---|---|---|---|---|---|---|---|---|---|---|---|---|---|---|---|
| 15 | L12 | 1230 | No | Yes | 280 | 590 | 60.5 | 0.8 | 0.7 | 0.6 | 850 | 1300 | 25 | 32500 | 7.5 | 0.12 | Comp. ex. |

Note 1.
Underlines show outside suitable range.
Note 2.
EL: 45 MPa indicates the elongation in 45 MPa hydrogen divided by elongation in air,
EL: 90 MPa indicates the elongation in 90 MPa hydrogen divided by elongation in air, and
EL: 120 MPa indicates the elongation in 120 MPa hydrogen divided by elongation in air.

TABLE 3-2

(Continuation of Table 3-1)

| Test No. | Steel No. | Heating temp. (°C.) | Hot rolled sheet annealing | Cold rolling + annealing | Tensile test in air 0.2% PS (MPa) | TS (MPa) | EL (%) | Tensile test in high pressure hydrogen gas EL: 45 MPa (—) | EL: 90 MPa (—) | EL: 120 MPa (—) | Tensile test in liquid hydrogen 0.2% PS (MPa) | TS (MPa) | EL (%) | TS × EL (MPa · %) | δ-ferrite volume rate (%) | δ-ferrite long axis (mm) | Remarks |
|---|---|---|---|---|---|---|---|---|---|---|---|---|---|---|---|---|---|
| 16 | L13 | 1220 | No | Yes | 230 | 550 | 55.5 | 0.8 | 0.8 | 0.7 | 400 | 1250 | 42 | 52500 | 11 | 0.11 | Comp. ex. |
| 17 | L14 | 1220 | No | Yes | 260 | 595 | 75.5 | 0.9 | 0.9 | 0.8 | 600 | 1470 | 41 | 60270 | 6.8 | 0.12 | Comp. ex. |
| 18 | L15 | 1220 | No | Yes | 220 | 550 | 76.5 | 0.9 | 0.9 | 0.8 | 700 | 1470 | 34 | 49980 | 5.2 | 0.11 | Comp. ex. |
| 19 | L16 | 1220 | No | Yes | 230 | 540 | 74.5 | 0.9 | 0.9 | 0.8 | 700 | 1470 | 35 | 51450 | 5.5 | 0.11 | Comp. ex. |
| 20 | L17 | 1230 | No | Yes | 270 | 600 | 86.5 | 1.1 | 1.2 | 1.1 | 620 | 1550 | 43 | 66650 | 4.5 | 0.04 | Inv. ex. |
| 21 | L18 | 1230 | No | Yes | 270 | 600 | 85.5 | 1.1 | 1.2 | 1.1 | 630 | 1550 | 43 | 66650 | 4.5 | 0.04 | Inv. ex. |
| 22 | L19 | 1270 | Yes | No | 270 | 600 | 88.2 | 1.1 | 1.2 | 1.1 | 670 | 1580 | 42 | 66350 | 1.4 | 0.01 | Inv. ex. |
| 23 | L20 | 1270 | Yes | No | 275 | 595 | 88.0 | 1.1 | 1.2 | 1.1 | 670 | 1570 | 41 | 66370 | 1.5 | 0.02 | Inv. ex. |
| SUS316L | | Yes | Yes | No | 230 | 570 | 84.4 | 1.1 | 1.0 | 0.9 | 550 | 1500 | 39 | 58500 | 6.5 | 0.08 | Conv. Ex. 1 |
| SUS316L | | Yes | Yes | Yes | 250 | 580 | 83.8 | 1.1 | 1.0 | 1.0 | 560 | 1480 | 38 | 56240 | 5.8 | 0.06 | Conv. Ex. 2 |
| SUS304L | | Yes | Yes | No | 253 | 560 | 41.8 | 0.6 | 0.5 | 0.3 | 390 | 1650 | 40 | 66000 | 3.5 | 0.07 | Conv. Ex. 3 |

Note 1.
Underlines show outside suitable range.
Note 2.
EL:45 MPa indicates the elongation in 45 MPa hydrogen divided by elongation in air,
EL: 90 MPa indicates the elongation in 90 MPa hydrogen divided by elongation in air, and
EL: 120 MPa indicates the elongation in 120 MPa hydrogen divided by elongation in air.

The invention examples, that is, Test Nos. 1 to 8 and 20 to 23, satisfied the composition of ingredients of the austenitic high Mn stainless steel of the present invention and as a result gave the desired steel structures. It was confirmed that the EL: 45 MPa, EL: 90 MPa, and EL: 120 MPa of Test Nos. 1 to 8 and 20 to 23 were larger than the EL: 45 MPa, EL: 90 MPa, and EL: 120 MPa of Conventional Example 1 and that Test Nos. 1 to 8 and 20 to 23 had excellent hydrogen embrittlement resistances equal to or better than the targeted SUS316L.

Further, it could be confirmed that Test Piece Nos. 1 to 8 and 20 to 23 had TS×EL which were larger than the TS×EL of Conventional Example 1 or Conventional Example 2, that is, had excellent hydrogen environment embrittlement resistances in liquid hydrogen equal to or better than SUS316L.

Furthermore, Test Nos. 1, 3, 5, 6, 8, 20, 21, 22, and 23 included annealing after hot working or cold working as is after hot working, then annealing, so the EL: 45 MPa, EL: 90 MPa, and EL: 120 MPa of Test Nos. 1, 3, 5, 6, 8, 20, 21, 22, and 23 were larger than the EL: 45 MPa, EL: 90 MPa, and EL: 120 MPa. It was confirmed that Test Nos. 1, 3, 5, 6, 8, 20, 21, 22, and 23 had extremely excellent hydrogen embrittlement resistances.

Further, the TS×EL of Test Nos. 1, 3, 5, 6, 8, 20, 21, 22, and 23 were larger than the TS×EL of Conventional Example 3. It was confirmed that Test Nos. 1, 3, 5, 6, 8, 20, 21, 22, and 23 had extremely excellent hydrogen environment embrittlement resistance in liquid hydrogen.

As opposed to this, Test Nos. 9 to 19 were off from the composition of ingredients of the austenitic high Mn stainless steel of the present invention. Even if, as prescribed in the present invention, annealing after hot working or cold working as is after hot working, then annealing, it was not possible to obtain the desired steel structures. As a result, it was confirmed that the steels were inferior in one or both of the hydrogen environment embrittlement resistance in high pressure hydrogen gas and hydrogen environment embrittlement resistance in liquid hydrogen.

The hydrogen environment embrittlement resistances of the high N test materials are shown in Table 4-1 and Table 4-2.

Table 4-1 and Table 4-2 describe the heating temperature at the time of hot working, the presence of annealing of hot rolled sheet, and the presence of cold rolling (including annealing after cold rolling).

amounts of Ni of 6 to 8%. Due to this, without the process of annealing after hot working or the process of cold working as is after hot working, then annealing, the steels had extremely excellent hydrogen embrittlement resistances in high pres-

TABLE 4-1

| Test No. | Steel No. | Heating temp. (°C.) | Hot rolled sheet annealing | Cold rolling + annealing | Tensile test in air 0.2% PS (MPa) | Tensile test in air TS (MPa) | Tensile test in air EL (%) | Tensile test in high pressure hydrogen gas EL: 45 MPa (—) | Tensile test in high pressure hydrogen gas EL: 90 MPa (—) | Tensile test in high pressure hydrogen gas EL: 120 MPa (—) | Tensile test in liquid hydrogen 0.2% PS (MPa) | Tensile test in liquid hydrogen TS (MPa) | Tensile test in liquid hydrogen EL (%) | Tensile test in liquid hydrogen TS × EL (MPa · %) | δ-ferrite volume rate (%) | δ-ferrite long axis (mm) | Remarks |
|---|---|---|---|---|---|---|---|---|---|---|---|---|---|---|---|---|---|
| 51 | H1 | 1220 | Yes | No | 450 | 780 | 65.5 | 1.2 | 1.2 | 1.2 | 750 | 1950 | 34 | 66300 | 0.2 | 0.01 | Inv. ex. |
| 52 | H2 | 1250 | No | Yes | 380 | 740 | 62.5 | 1.2 | 1.3 | 1.2 | 720 | 1890 | 37 | 69930 | 0.1 | 0.01 | Inv. ex. |
| 53 |  | 1180 | Yes | No | 380 | 740 | 62.5 | 1.2 | 1.2 | 1.1 | 740 | 1900 | 36 | 68400 | 1.5 | 0.02 | Inv. ex. |
| 54 | H3 | 1250 | No | Yes | 410 | 750 | 65.2 | 1.2 | 1.2 | 1.1 | 700 | 1900 | 35 | 66500 | 0.1 | 0.01 | Inv. ex. |
| 55 |  | 1180 | No | Yes | 430 | 770 | 61.2 | 1.2 | 1.1 | 1.1 | 720 | 1920 | 35 | 67200 | 0.1 | 0.01 | Inv. ex. |
| 56 | H4 | 1250 | Yes | Yes | 400 | 760 | 62.5 | 1.2 | 1.2 | 1.1 | 710 | 1850 | 37 | 68450 | 0.2 | 0.02 | Inv. ex. |
| 57 | H5 | 1220 | No | Yes | 420 | 750 | 61.5 | 1.2 | 1.2 | 1.1 | 730 | 1880 | 36 | 67680 | 0.5 | 0.02 | Inv. ex. |
| 58 | H6 | 1220 | Yes | No | 490 | 850 | 38.5 | 0.7 | 0.6 | 0.5 | 1000 | 1800 | 20 | 36000 | 0.1 | 0.01 | Comp. ex. |
| 59 |  | 1180 | Yes | No | 510 | 880 | 35.5 | 0.6 | 0.6 | 0.5 | 1100 | 1750 | 19 | 33250 | 0.1 | 0.01 | Comp. ex. |
| 60 | H7 | 1220 | Yes | No | 530 | 900 | 32.5 | 0.6 | 0.5 | 0.4 | 1200 | 1600 | 18 | 28800 | 0.1 | 0.01 | Comp. ex. |
| 61 |  | 1180 | Yes | No | 550 | 910 | 31.5 | 0.6 | 0.5 | 0.4 | 1200 | 1550 | 15 | 23250 | 0.1 | 0.01 | Comp. ex. |
| 62 | H8 | 1220 | Yes | No | 470 | 830 | 58.5 | 1.1 | 1.1 | 1.1 | 1100 | 1700 | 25 | 42500 | 0.1 | 0.01 | Comp. ex. |
| 63 |  | 1180 | Yes | No | 480 | 840 | 57.5 | 1.1 | 1.1 | 1.1 | 1100 | 1750 | 28 | 49000 | 0.1 | 0.01 | Comp. ex. |
| 64 | H9 | 1230 | Yes | No | 490 | 860 | 52.5 | 1.1 | 1.1 | 0.9 | 980 | 1600 | 25 | 40000 | 0.2 | 0.02 | Comp. ex. |
| 65 | H10 | 1240 | Yes | No | 520 | 900 | 48.5 | 1.0 | 1.0 | 0.9 | 1010 | 1570 | 27 | 42390 | 0.3 | 0.03 | Comp. ex. |
| 66 | H11 | 1230 | Yes | No | 470 | 860 | 58.5 | 1.1 | 1.1 | 0.9 | 990 | 1550 | 29 | 44950 | 0.2 | 0.02 | Comp. ex. |
| 67 | H12 | 1250 | Yes | No | 480 | 860 | 56.5 | 1.1 | 1.1 | 0.9 | 950 | 1480 | 26 | 38480 | 0.1 | 0.01 | Comp. ex. |
| 68 | H13 | 1240 | Yes | No | 490 | 880 | 55.5 | 1.1 | 1.1 | 0.9 | 990 | 1490 | 29 | 43210 | 0.2 | 0.02 | Comp. ex. |
| 69 | H14 | 1230 | Yes | No | 500 | 900 | 57.5 | 1.1 | 1.1 | 0.9 | 1020 | 1550 | 30 | 46500 | 0.2 | 0.02 | Comp. ex. |
| 70 | H15 | 1240 | Yes | No | 470 | 860 | 58.5 | 1.1 | 1.1 | 0.9 | 880 | 1700 | 30 | 51000 | 0.2 | 0.03 | Comp. ex. |

Note 1.
Underlines show outside suitable range.
Note 2.
EL: 45 MPa indicates the elongation in 45 MPa hydrogen divided by elongation in air,
EL: 90 MPa indicates the elongation in 90 MPa hydrogen divided by elongation in air, and
EL: 120 MPa indicates the elongation in 120 MPa hydrogen divided by elongation in air.

TABLE 4-2

(Continuation of Table 4-1)

| Test No. | Steel No. | Heating temp. (°C.) | Hot rolled sheet annealing | Cold rolling + annealing | Tensile test in air 0.2% PS (MPa) | Tensile test in air TS (MPa) | Tensile test in air EL (%) | Tensile test in high pressure hydrogen gas EL: 45 MPa (—) | Tensile test in high pressure hydrogen gas EL: 90 MPa (—) | Tensile test in high pressure hydrogen gas EL: 120 MPa (—) | Tensile test in liquid hydrogen 0.2% mPS (MPa) | Tensile test in liquid hydrogen TS (MPa) | Tensile test in liquid hydrogen EL (%) | Tensile test in liquid hydrogen TS × EL (MPa · %) | δ-ferrite volume rate (%) | δ-ferrite long axis (mm) | Remarks |
|---|---|---|---|---|---|---|---|---|---|---|---|---|---|---|---|---|---|
| 71 | H16 | 1250 | No | Yes | 380 | 730 | 63.5 | 1.2 | 1.3 | 0.9 | 760 | 1890 | 29 | 54810 | 0.1 | 0.01 | Comp. ex. |
| 72 | H17 | 1250 | No | Yes | 390 | 750 | 61.5 | 1.2 | 1.3 | 0.8 | 780 | 1890 | 29 | 54810 | 0.1 | 0.01 | Comp. ex. |
| 73 | H18 | 1250 | No | Yes | 400 | 760 | 62.5 | 1.2 | 1.3 | 1.2 | 730 | 1880 | 36 | 67680 | 0.1 | 0.01 | Inv. ex. |
| 74 | H19 | 1250 | Yes | Yes | 400 | 750 | 62.6 | 1.2 | 1.2 | 1.1 | 710 | 1850 | 37 | 68500 | 0.2 | 0.02 | Inv. ex. |
| 75 | H20 | 1250 | Yes | Yes | 410 | 760 | 62.4 | 1.2 | 1.2 | 1.1 | 700 | 1870 | 35 | 68400 | 0.2 | 0.01 | Inv. ex. |
| 76 | H21 | 1250 | Yes | Yes | 400 | 740 | 62.5 | 1.2 | 1.2 | 1.1 | 720 | 1840 | 36 | 68450 | 0.2 | 0.02 | Inv. ex. |
| 77 | H22 | 1250 | Yes | Yes | 390 | 760 | 62.5 | 1.2 | 1.2 | 1.1 | 700 | 1860 | 35 | 68550 | 0.2 | 0.01 | Inv. ex. |
| 78 | H23 | 1250 | Yes | Yes | 400 | 750 | 62.6 | 1.2 | 1.2 | 1.1 | 710 | 1850 | 37 | 68500 | 0.2 | 0.01 | Inv. ex. |
| SUS316L |  | Yes | Yes | No | 230 | 570 | 84.4 | 1.1 | 1.0 | 0.9 | 550 | 1500 | 39 | 58500 | 6.5 | 0.08 | Conv. Ex. 1 |
| SUS316L |  | Yes | Yes | Yes | 250 | 580 | 83.8 | 1.1 | 1.0 | 1.0 | 560 | 1480 | 38 | 56240 | 5.8 | 0.06 | Conv. Ex. 2 |
| SUS304L |  | Yes | Yes | No | 253 | 560 | 41.8 | 0.6 | 0.5 | 0.3 | 390 | 1650 | 40 | 66000 | 3.5 | 0.07 | Conv. Ex. 3 |

Note 1.
Underlines show outside suitable range.
Note 2.
EL: 45 MPa indicates the elongation in 45 MPa hydrogen divided by elongation in air,
EL: 90 MPa indicates the elongation in 90 MPa hydrogen divided by elongation in air, and
EL: 120 MPa indicates the elongation in 120 MPa hydrogen divided by elongation in air.

Test Nos. 51 to 57 and 73 to 78 satisfied the composition of ingredients of austenitic high Mn stainless steel of the present invention. That is, Test Nos. 51 to 57 and 73 to 78 had amounts of N in the steel of 0.15 to 0.3% and, along with this, had sure hydrogen gas equal to or better than the SUS316L targeted and extremely excellent hydrogen environment embrittlement resistance in liquid hydrogen equal to or better than SUS304L.

As opposed to this, Test Nos. 58 to 61 were hot rolled cast slabs of Steel Nos. H6 to H7 with amounts of Ni in the steel of over 0.3%. It could be confirmed that the hydrogen environment embrittlement resistance in high pressure hydrogen gas and in liquid hydrogen greatly fell. Test Nos. 62 and 63 were hot rolled cast slabs of Steel No. H8 with amounts of Ni of less than 6%. While excellent in hydrogen environment embrittlement resistance in high pressure hydrogen gas, they did not have the desired hydrogen environment embrittlement resistance in liquid hydrogen. Test Nos. 64 to 72 were hot rolled cast slabs of steel with compositions of ingredients of elements other than Ni which were outside the scope of the present invention. While excellent in hydrogen environment embrittlement resistance in high pressure hydrogen gas, they did not have the desired hydrogen environment embrittlement resistance in liquid hydrogen.

Note that, the above explanation only illustrates embodiments of the present invention. The present invention can be changed in various ways within the scope of the claims.

Industrial Applicability

According to the present invention, it is possible to obtain austenitic high Mn stainless steel which is provided with both a hydrogen embrittlement resistance in high pressure hydrogen gas equal or better than that of SUS316L steel and a hydrogen environment embrittlement resistance in liquid hydrogen with a strength-ductility balance equal or better than that of SUS316L steel, more preferably equal or better than that of SUS304L steel. The present invention exhibits remarkable effects in industry.

Further, according to the present invention, it is possible to give the container body or liner of a tank which stores over 40 MPa high pressure hydrogen gas and liquid hydrogen and piping, valves, meters, etc. an equal or better hydrogen environment embrittlement resistance compared with SUS316L steel or SUS304 steel without an accompanying rise in cost. The present invention has value of utilization in industry.

The invention claimed is:

1. Austenitic high Mn stainless steel characterized by containing, by mass%, C: 0.1% or less, Si: 0.4 to 1.5%, Mn: 8 to 11%, Cr: 15 to 17%, Ni: 5 to 8%, Cu: 1 to 4%, Mo: 0.05 to 0.2%, and N: 0.01 to less than 0.15% and having a balance of Fe and unavoidable impurities, having a volume rate of δ-ferrite of 5% or less, and having a long axis of δ-ferrite of less than 0.05 mm.

2. Austenitic high Mn stainless steel characterized by containing, by mass%, C: 0.1% or less, Si: 0.4 to 1.5%, Mn: 8 to 11%, Cr: 15 to 17%, Ni: 6 to 8%, Cu: 1 to 4%, Mo: 0.05 to 0.2%, and N: 0.15 to 0.3% and having a balance of Fe and unavoidable impurities, having a volume rate of δ-ferrite of 5% or less, and having a long axis of δ-ferrite of less than 0.05 mm.

3. The austenitic high Mn stainless steel as set forth in claim 1 characterized in that said steel further contains, by mass%, one or more types of elements selected from Al: 0.2% or less, B: 0.01% or less, Ca: 0.01% or less, Mg: 0.01% or less, and REM: 0.1% or less.

4. The austenitic high Mn stainless steel as set forth in claim 2 characterized in that said steel further contains, by mass%, one or more types of elements selected from Al: 0.2% or less, B: 0.01% or less, Ca: 0.01% or less, Mg: 0.045% or less, and REM: 0.1% or less.

5. A method of production of austenitic high Mn stainless steel as set forth in claim 1, said method of production of austenitic high Mn stainless steel characterized by heating steel, which contains, by mass%, C: 0.1% or less, Si: 0.4 to 1.5%, Mn: 8 to 11%, Cr: 15 to 17%, Ni: 5 to 8%, Cu: 1 to 4%, Mo: 0.05 to 0.2%, and N: 0.01 to less than 0.15% and has a balance of Fe and unavoidable impurities, at 1200 to 1300° C. for 1 hour or more, then hot working it, then annealing it at 900 to 1300° C. to refine δ-ferrite.

6. A method of production of austenitic high Mn stainless steel as set forth in claim 1, said method of production of austenitic high Mn stainless steel characterized by heating steel, which contains, by mass%, C: 0.1% or less, Si: 0.4 to 1.5%, Mn: 8 to 11%, Cr: 15 to 17%, Ni: 5 to 8%, Cu: 1 to 4%, Mo: 0.05 to 0.2%, and N: 0.01 to less than 0.15% and has a balance of Fe and unavoidable impurities, at 1200 to 1300° C. for 1 hour or more, then hot working it, then cold working it without annealing, then annealing it at 900 to 1200° C. to refine δ-ferrite.

7. A method of production of austenitic high Mn stainless steel as set forth in claim 5 characterized in that said steel further contains, by mass%, one or more types of elements selected from Al: 0.2% or less, B: 0.01% or less, Ca: 0.01% or less, Mg: 0. 01% or less, and REM: 0.1% or less.

8. A gas tank for high pressure hydrogen use which stores high pressure hydrogen gas with a pressure of 0.1 to 120 MPa, said gas tank for high pressure hydrogen use characterized in that at least one of a container body and liner of said gas tank for high pressure hydrogen use is comprised of the austenitic high Mn stainless steel as set forth in claim 1.

9. A tank for liquid hydrogen use which stores liquid hydrogen, said tank for liquid hydrogen use characterized in that at least one of a container body and liner of said tank for liquid hydrogen use is comprised of the austenitic high Mn stainless steel as set forth in claim 1.

10. Piping for liquid hydrogen use comprised of piping which transports high pressure hydrogen gas of a pressure of 0.1 to 120 MPa, characterized in that said piping is comprised of the austenitic high Mn stainless steel as set forth in claim 1.

11. A valve for high pressure hydrogen use comprised of a valve which is to be connected to piping which transports high pressure hydrogen gas of a pressure of 0.1 to 120 MPa, characterized in that said valve is comprised of the austenitic high Mn stainless steel as set forth in claim 1.

12. Piping for liquid hydrogen use comprised of piping which transports liquid hydrogen, characterized in that said piping is comprised of the austenitic high Mn stainless steel as set forth in claim 1.

13. A valve for liquid hydrogen use comprised of a valve which is to be connected to piping which transports liquid hydrogen, characterized in that said valve is comprised of the austenitic high Mn stainless steel as set forth in claim 1.

14. A method of production of austenitic high Mn stainless steel as set forth in claim 6 characterized in that said steel further contains, by mass%, one or more types of elements selected from Al: 0.2% or less, B: 0.01% or less, Ca: 0.01% or less, Mg: 0.01% or less, and REM: 0.1% or less.

15. A gas tank for high pressure hydrogen use which stores high pressure hydrogen gas with a pressure of 0.1 to 120 MPa, said gas tank for high pressure hydrogen use characterized in that at least one of a container body and liner of said gas tank for high pressure hydrogen use is comprised of the austenitic high Mn stainless steel as set forth in claim 2.

16. A gas tank for high pressure hydrogen use which stores high pressure hydrogen gas with a pressure of 0.1 to 120 MPa, said gas tank for high pressure hydrogen use characterized in that at least one of a container body and liner of said gas tank for high pressure hydrogen use is comprised of the austenitic high Mn stainless steel as set forth in claim 3.

17. A gas tank for high pressure hydrogen use which stores high pressure hydrogen gas with a pressure of 0.1 to 120 MPa, said gas tank for high pressure hydrogen use characterized in that at least one of a container body and liner of said gas tank for high pressure hydrogen use is comprised of the austenitic high Mn stainless steel as set forth in claim 4.

18. A tank for liquid hydrogen use which stores liquid hydrogen, said tank for liquid hydrogen use characterized in that at least one of a container body and liner of said tank for liquid hydrogen use is comprised of the austenitic high Mn stainless steel as set forth in claim 2.

19. A tank for liquid hydrogen use which stores liquid hydrogen, said tank for liquid hydrogen use characterized in that at least one of a container body and liner of said tank for liquid hydrogen use is comprised of the austenitic high Mn stainless steel as set forth in claim 3.

20. A tank for liquid hydrogen use which stores liquid hydrogen, said tank for liquid hydrogen use characterized in that at least one of a container body and liner of said tank for liquid hydrogen use is comprised of the austenitic high Mn stainless steel as set forth in claim 4.

\* \* \* \* \*